Patented Apr. 2, 1935

1,996,216

UNITED STATES PATENT OFFICE 1,996,216

NEW CELLULOID LIKE ARTIFICIAL COMPOUND OF A POLYVINYL ALCOHOL ALDEHYDE CONDENSATION PRODUCT

Fritz Schmidt, Troisdorf, near Cologne-on-the-Rhine, Germany

No Drawing. Application October 29, 1931, Serial No. 571,858. In Germany October 30, 1930

7 Claims. (Cl. 106—22)

My invention relates to celluloid like artificial compounds and to a method of making the same.

It is an object of my invention to obtain a compound possessing substantially the properties of celluloid.

To this end I treat condensation products of polyvinyl alcohols and aldehydes by a process similar to that employed in celluloid manufacture.

It has already been proposed to use artificial resins for making celluloid like compounds but it has been found that all such compounds are not even approximately equal to celluloid in their properties, particularly in their strength, ductility with respect to doubling-up, resiliency, and resistance to low and high temperatures.

According to my invention I obtain a compound which is similar to celluloid to a surprising degree and even superior to it in certain of its particularly important properties, such as its very high bending and doubling-up strength, its extraordinary toughness and elasticity.

The condensation products are preferably mixed with acid or a substance with acid reaction, and a high-boiling solvent. To this mixture may be added a softener, filter, colour, etc.

For example, 100 kilogrammes of polyvinyl-alcohol-formaldehyde condensation product are gelatinated in a kneader with 60 litres of alcohol and 30 litres of benzol at 30° C. The hot product from the kneader is coloured on hot rolls and the major portion of the solvents is forced out by rolling. The rolled compound is cut to the size of a block press, heated in the boiling press i. e., a press which is employed to remove gas bubbles by the application of heat and pressure and to form the product into a solid block at 80° C. and 20 kilogrammes per sq. centimetre for six hours, and then cooled. Foils are cut from the block in the manner known in celluloid manufacture, dried and polished, if desired.

Or 90 kilogrammes of a polyvinyl-alcohol-formaldehyde condensation product are gelatinized at 80° C. with 10 kilogrammes of p-toluolsulfonamid, 60 litres of alcohol and 30 litres of benzol, and then treated as above.

Foils of my novel compound will not lose their good properties at temperatures down to 15° C. below zero. This is the more remarkable as plastic substances with acetyl cellulose as the base become fragile and brittle at such low temperatures while foils of other artificial resins are normally so at room temperature.

As compared with celluloid, my novel compound has the advantage that while inflammable it may be treated by any normal process without any risk of spontaneous ignition.

The good properties of my novel compound also make it superior to other artificial resins with respect to the facility with which it is worked. Thus, hollow articles such as dolls are readily blown from foils of my novel compound. This shows plainly its decided advantage because it was very difficult to obtain from all artificial resins proposed heretofore, and even from celluloid and cellon, the latter being a celluloidlike product derived from acetyl cellulose, a compound suitable for blowing.

The material may be worked into a celluloid like product in the usual manner of celluloid manufacture, as described above.

I claim:

1. A process which comprises gelatinizing a polyvinyl alcohol-formaldehyde condensation product in the presence of a high-boiling inert diluent which acts as a solvent for said condensation product, rolling said gelatinized product to partially expel the solvent therefrom and subjecting the resultant product to heat and pressure.

2. A new article of manufacture obtainable by gelatinizing a polyvinyl alcohol-formaldehyde condensation product in the presence of a plasticizing agent and of a high-boiling inert diluent which diluent acts as a solvent for said condensation product and removing the solvent from said gelatinized product.

3. A process which comprises gelatinizing a polyvinyl alcohol formaldehyde condensation product by kneading said product in the presence of a high-boiling inert diluent which acts as a solvent for said product, rolling the gelatinized product to partially expel the solvent therefrom, then heating the product under pressure to remove bubbles therefrom, cooling the bubble free product and drying said product.

4. A process which comprises gelatinizing a polyvinyl alcohol formaldehyde condensation product by kneading said product in the presence of a plasticizer and of a high-boiling inert diluent which acts as a solvent for said product, rolling the gelatinized product to partially expel the solvent therefrom, then heating the product under pressure to remove bubbles therefrom, cooling the bubble free product and drying said product.

5. A process which comprises gelatinizing a polyvinyl alcohol formaldehyde condensation product by kneading said product in the presence of a mixture of alcohol and benzol, rolling the gelatinized product to partially expel the solvent therefrom, then heating the product under pressure to remove bubbles therefrom, cooling the bubble free product and drying said product.

6. The product obtainable in accordance with the process defined in claim 3.

7. A process which comprises gelatinizing a polyvinyl alcohol-formaldehyde condensation product in the presence of a high boiling inert diluent which acts as a solvent for said product, rolling the gelatinized product to partially expel the solvent therefrom, forming the product into a solid block by the application of heat and pressure and cutting the block into foils.

FRITZ SCHMIDT.